United States Patent [19]
Hughes et al.

[11] Patent Number: 5,125,056
[45] Date of Patent: Jun. 23, 1992

[54] FIBER OPTIC CONNECTOR ASSEMBLY

[75] Inventors: Richard M. Hughes, Glendora; Jack R. Exley, Anaheim, both of Calif.

[73] Assignee: McDonnell Douglas Corporation, St. Louis, Mo.

[21] Appl. No.: 559,329

[22] Filed: Aug. 28, 1990

Related U.S. Application Data

[63] Continuation of Ser. No. 863,079, May 14, 1986, abandoned.

[51] Int. Cl.$^5$ ................................................ G02B 6/38
[52] U.S. Cl. ....................................... 385/59; 385/60; 385/73; 385/75
[58] Field of Search ............... 350/96.20, 96.21, 96.22, 350/96.23; 385/59, 60, 66–68, 73, 75, 135–139

[56] References Cited

U.S. PATENT DOCUMENTS

| | | | |
|---|---|---|---|
| 4,225,214 | 9/1980 | Hodge et al. | 350/96.21 |
| 4,411,491 | 10/1983 | Larkin et al. | 350/96.21 |
| 4,478,487 | 10/1984 | Obeissart | 350/96.21 |
| 4,666,242 | 5/1987 | Cairns | 350/96.21 |
| 4,682,848 | 7/1987 | Cairns et al. | 350/96.21 |
| 4,696,540 | 9/1987 | Adams et al. | 350/96.21 |

FOREIGN PATENT DOCUMENTS

| | | | |
|---|---|---|---|
| 86/02173 | 4/1986 | PCT Int'l Appl. | 350/96.21 |
| 2034496 | 6/1980 | United Kingdom | 350/96.21 |
| 2126368 | 3/1984 | United Kingdom | 350/96.21 |

*Primary Examiner*—John D. Lee
*Attorney, Agent, or Firm*—Benjamin Hudson, Jr.; Timothy H. Courson; Guy R. Gosnell

[57] ABSTRACT

There is provided by this disclosure a fiber optical connector assembly for mating and demating optical fibers in a contaminated air or an underwater environment. Elastomeric seals having normally closed apertures cover the mating end of the male and female connecting members to seal and protect the abutting ends of optical fibers within the connector assembly in a contaminant free fluid. The surface of each mating end has regions of convexity and concavity forming peaks and valleys to seal and maintain a contaminate free environment when the male and female connecting members are brought together. A locking means is provided for automatically locking the connecting members in the mated position to prevent axial, angular, transverse, or rotational movement at the optical interface. The connecting members are configured to store a predetermined length of optical fiber as a service loop to facilitate multiple terminations to the optical fiber without the need to rework the termination to the cable itself.

22 Claims, 5 Drawing Sheets

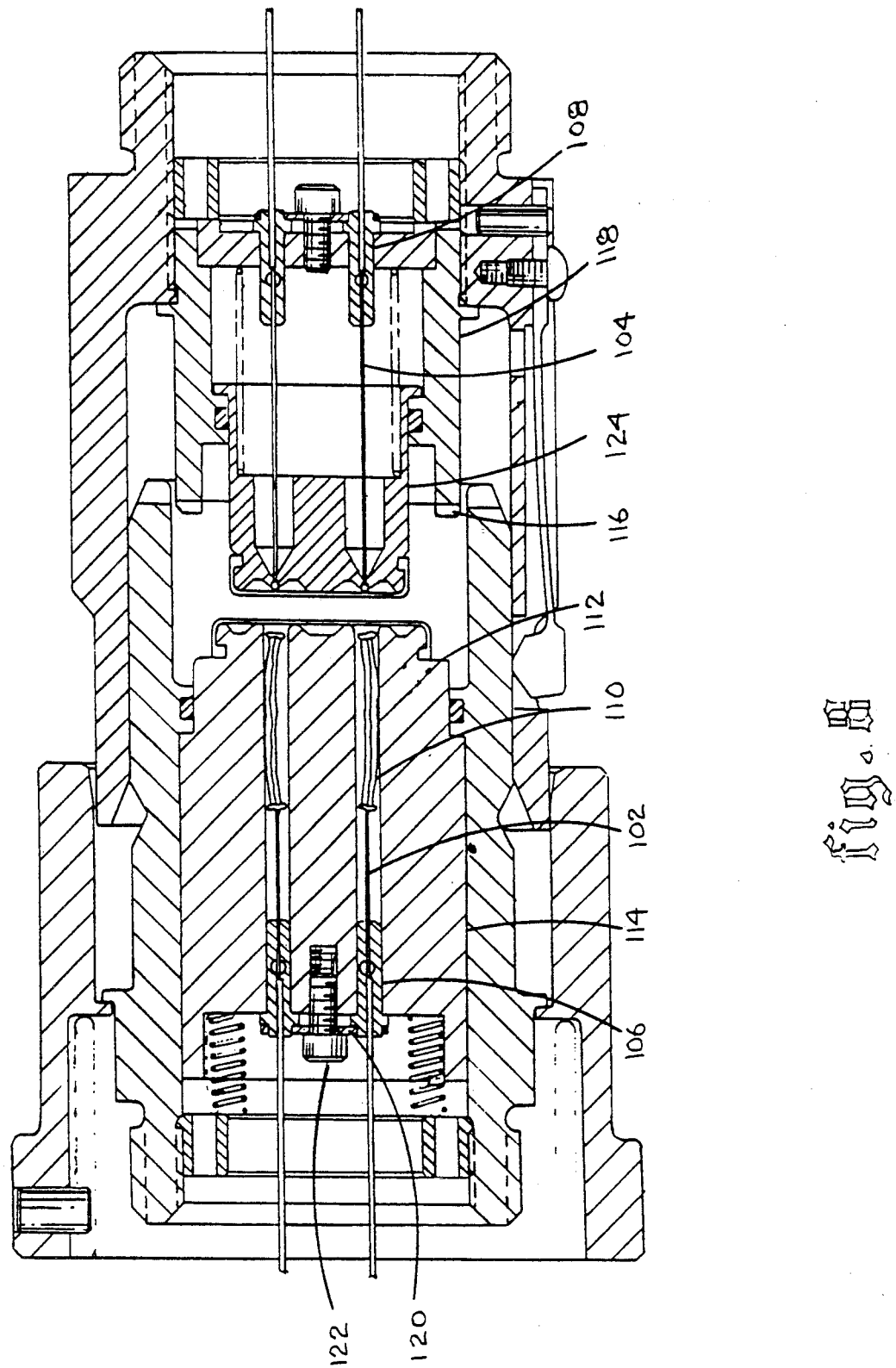

FIBER OPTIC CONNECTOR ASSEMBLY

This is a continuation of application Ser. No. 863,079, filed May 14, 1986 (abandoned).

BACKGROUND OF THE INVENTION

1. Field of the Invention

This invention relates generally to a connector assembly for interconnecting optical fibers, and more particularly to fiber optic connectors having elastomeric seals over the mating components to enclose and protect the optical interface from contamination during repeated mating and de-mating in a contaminated air or an underwater environment.

2. Description of the Prior Art

Various types of connectors are known that provide low loss coupling of optical fibers. They typically comprise a plug and receptacle or a plug-adapter-plug arrangement wherein precision mating coaxial components of the connector assembly containing pre-aligned fibers with optically prepared ends are brought together in the connecting process to achieve alignment and abutment of the mating fibers to within micron tolerances. These mating surfaces are usually covered by protective caps which are removed prior to engagement. The connecting of fibers can also be achieved within alignment guides, such as that described in U.S. Pat. No. 4,225,214, wherein abutting fibers are coaxially aligned by their own precision outside diameters in a common "V" groove or other similar means and thereby reduce the need for precision alignment and engagement of the supporting mechanical elements in the connector halves. However, the fiber ends are susceptible to contamination prior to engagement and a method for enclosing and protecting the fibers for this type of connecting device is described in U.S. Pat. No. 4,411,491 entitled "Connector Assembly with Elastomeric Sealing Membranes Having Slits." The plug component has an optical fiber contained therein and an elastomeric sealing membrane with slit covering the mating end and sealing same. The receptacle component has an optical fiber receiving means therein and also an elastomeric sealing membrane with slit covering the mating end and sealing same. The connector further includes displacement means which open and close the slits to permit passage of the fiber during engagement and disengagement of the components. However, none of the engagement techniques described therein prevent the fiber from being exposed to the environment during the actual mating sequence and thus the aforementioned disclosure does not provide a method for engagement of optical fibers within a contaminated environment. Other prior art fiber optic connectors use lenses to expand the optical path at the connecting interface to reduce the effect of small particles or suspended matter between the connecting optical elements. Critical mechanical alignment and protection of the mating optical elements from environmental effects is still a requirement, however.

While such alignment and mating techniques provide acceptable connector loss for many optical fibers under limited environmental conditions, none provide adequate means for achieving repeatable low-loss coupling of single-mode fiber in a contaminated high-pressure environment such as found near the ocean sea floor.

It is an object of this invention to provide a fiber optic connector suitable for deep ocean use that seals and protects the mating ends of abutting optical fibers in each connector half prior to mating and has the means for maintaining this sealed condition during repeated engagement and disengagement without exposing the fiber or its optical interface to the surrounding environment.

Another object of this invention is to provide complete interchangeability of plugs and receptacles while accomplishing the mating/de-mating of the connector halves by a simple push-pull operation without regard to rotational orientation. Furthermore, means are provided for automatically locking the connecting components in the mated position to prevent axial, angular, transverse or rotational movement at the optical interface.

A third object of this invention is to provide a fiber optic connector having a predetermined length of optical fiber as a service loop within the connector to facilitate multiple terminations to the optical fiber without the need to rework the termination to the cable itself and re-test for proper mechanical strength, strain relief, water blockage and optical performance under a high pressure environment.

SUMMARY OF THE INVENTION

There is provided by this invention, a fiber optic connector comprising a plug component and receptacle component suitable for interconnecting the ends of two optical fibers in air or underwater applications. The male component has an abutting optical fiber therein surrounded by a contaminant-free fluid and sealed by an elastomeric membrane with normally closed aperture which covers a first mating surface having regions of alternating concavity and convexity forming peaks and valleys. The female component has a fiber receiving means therein surrounded by a contaminant-free fluid and sealed by an elastomeric membrane with normally closed aperture which covers a second mating surface with peaks and valleys in an inverse position to the peaks and valleys of the male. Engagement of the mating surfaces seals the connecting components and then stretches the membranes, opening the apertures therein to allow passage of the optical fiber therethrough and into the receiving means without exposure to the surrounding environment. There is also provided a predetermined service length of optical fiber coiled into a loop within each connector half that facilitates connector assembly and replacement without re-terminating the fiber optic cable itself.

BRIEF DESCRIPTION OF THE DRAWINGS

FIG. 7 illustrates a cross-sectional view of the zero pressure differential device;

FIG. 8 illustrates a pre-engagement position of the mating ends of plug and receptacle connector members for a multi-fiber connector assembly;

BRIEF DESCRIPTION OF THE PREFERRED EMBODIMENT

Figure 1:
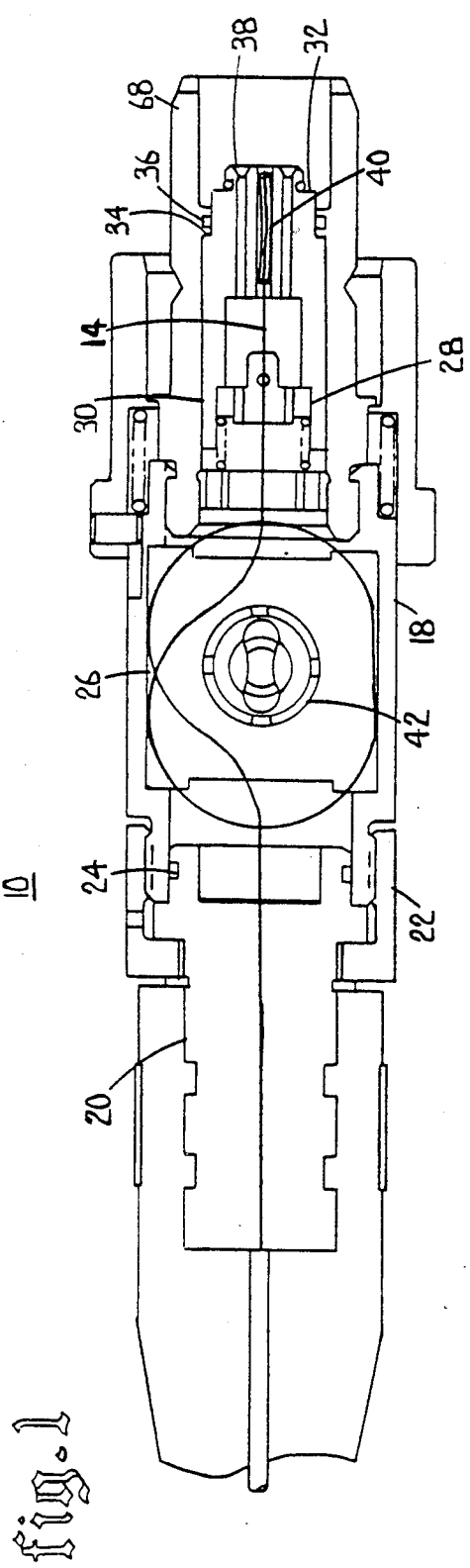
FIG. 1 illustrates a fiber optic plug component incorporating the principles of this invention.
Figure 2:
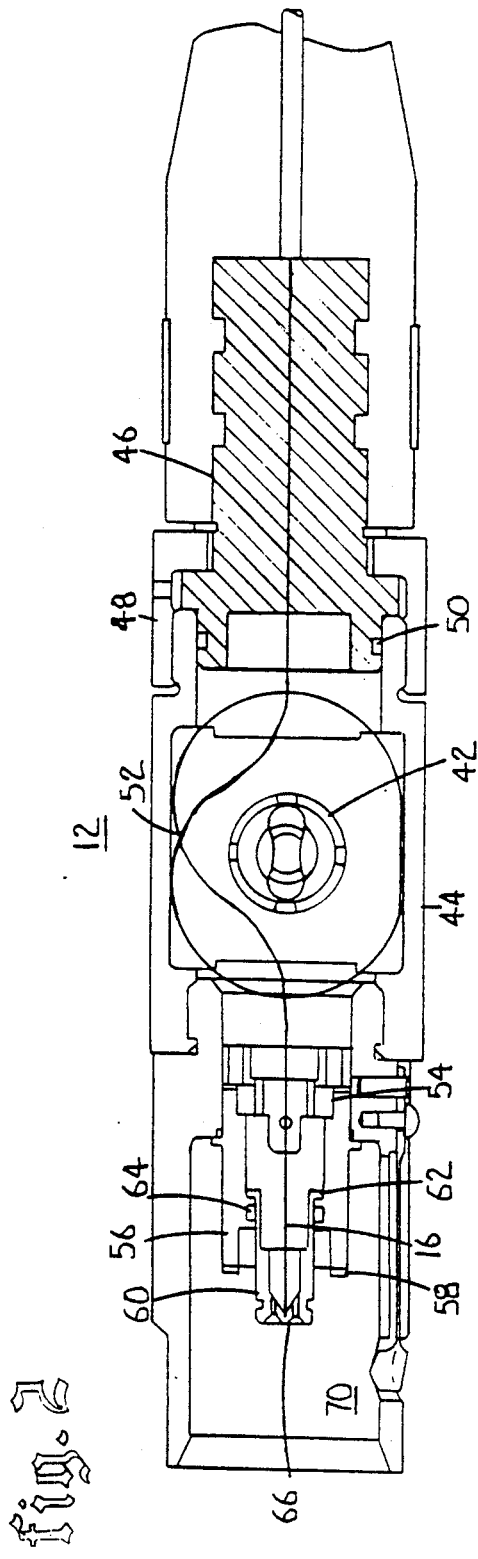
FIG. 2 illustrates a fiber optic receptacle component incorporating the principles of this invention.

Referring to FIGS. 1 and 2, there is shown a male connector component 10 and female connector component 12 disposed to make engagement in a deep ocean environment for the purpose of connecting the ends of two optical fibers 14 and 16. The male connector assembly 10 has a generally cylindrical housing 18 which is filled with an optically transparent fluid of low viscosity and suitable index of refraction, such as 100 cst Dow Corning 200 fluid. Sealing one end of the housing 18 is a cable terminator 20 that is mechanically connected to the housing 18 by coupling ring 22 and sealed by o-ring 24. The terminator 20 provides mechanical strain relief for the optical cable termination in a manner well known in the art. The optical fiber 14 is fed from the terminator 20 and coiled into service loop 26 that provides a predetermined length of optical fiber stored within housing 18 so that the fiber can be cut and the connector repaired or replaced a number of times. This combination of a pre-terminated cable together with an optical fiber service loop provides for easier replacement and servicing of the connector component in the field and eliminates the requirement for re-terminating the cable and the complex problems of proper strain relief, sealing and re-testing. From the service loop 26, the optical fiber 14 is fed thru a ferrule 28. The fiber 14 is then axially positioned and fixed relative to the ferrule 28 which in turn seats within a spring loaded guide holder 30 establishing a predetermined distance between the precision cleaved end of the fiber 14 and the annular mating surface 32 of the guide holder 30. The guide holder 30 seals the end of the housing 18 and is spring loaded against an annular shoulder 34 and sealed with o-ring 36 and elastic orifice seal 38.

Positioned and fixed within the guide holder 30 is an optical alignment guide 40 into which the end of fiber 14 is inserted. The fiber alignment guide 40 may be comprised of glass rods fused together in a juxtaposed parallel relationship to form a "V" groove or a cusp-shaped channel for the ends of the fiber. The end face of the guide holder 30 has alternating regions of concavity and convexity forming a surface having peaks and valleys. The elastic orifice seal 38 which covers this end face has an aperture therein through which the end of optical fiber 16 in the female connector assembly 12 may pass in a manner hereinafter described. The aperture in the orifice seal 38 is normally closed so as to prevent loss or contamination of the aforementioned optically transparent fluid that surrounds and protects the optical fiber 14 and its optical mating surface within the alignment guide 40. Displacement of said fluid within housing 18 due to axial motion of the spring loaded guide holder 30, or changes in fluid volume due to variations in pressure or temperature in the surrounding environment are offset by a pressure equalizer such as 42 in a manner hereinafter described.

The female connector assembly 12 has a housing 44 that is disposed to receive the housing 18 of the male connector assembly 10 in a telescoping manner. The female connector 12 also has a generally cylindrical housing filled with an optically transparent fluid. The housing 44 is sealed at one end by a cable terminator 46 that is connected to the housing 44 by collar 48 and sealed by o-ring 50. From the terminator 46 the optical fiber 16 is coiled into a service loop 52 that provides a predetermined length of optical fiber to be stored within the housing 44 so that the fiber can be cut and the connector repaired or replaced in the field several times without re-terminating the cable. The fiber 16 is fed into a ferrule 54 and axially positioned and fixed relative to the ferrule. The ferrule 54 seats within the plunger guide 56 establishing a predetermined distance between the precision cleaved end of fiber 16 and contact surfaces 58 on the plunger guide 56. Enclosing and protecting the fiber 16 is a plunger 60 that is spring loaded against an annular shoulder 62 and sealed with o-ring 64 and elastic orifice seal 66. The plunger 60 is reciprocally moveable within the plunger guide 56 upon the engagement and disengagement of the male and female connector assemblies. The mating end of the plunger 60 is comprised of alternating regions of concavity and convexity that form peaks and valleys in an inverse position to the peaks and valleys of the guide holder 30 of the male connector assembly 10. The elastic seal 66 covers the end surface of plunger 60 and has an aperture therein which allows the end of the fiber 16 to pass therethrough in a manner hereinafter described. The aperture in the orifice seal 66 is also normally closed so as to prevent loss or contamination of the aforementioned optically transparent fluid that surrounds and protects the optical fiber 16 and its optical mating surface within plunger 60.

During mating of the connector halves, the end 68 of the plug component assembly is inserted into a receiving aperture 70 of the receptacle connector assembly with no requirement for prior orientation. Sufficient diametrical clearance is maintained between the telescoping parts so that silt or other contamination does not interfere with the mating action. As the two halves are brought together, the plug body 18 is guided into the receptacle body 44 bringing the orifice seals 38 and 66 into contact and causing plunger 60 to be depressed into plunger guide 56 until the plunger guide contact surfaces 58 engage the mating annular shoulder 32 on guide holder 30. Displacement of the fluid within housing 44 due to axial motion of the spring loaded plunger 60 or changes in fluid volume due to variations in pressure or temperature in the surrounding environment are offset by a pressure equalizer such as 42 in a manner hereinafter described.

Figure 5:
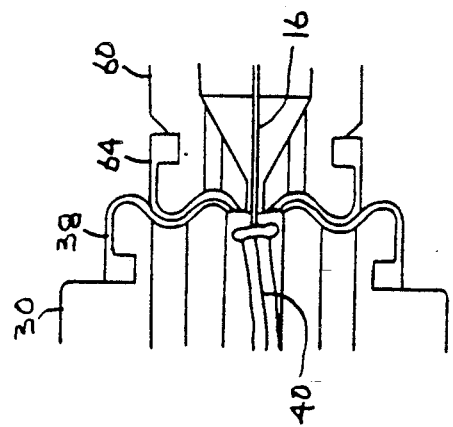
FIG. 5 illustrates the seated position of the mating ends of the male and female connector components.
Figure 4:
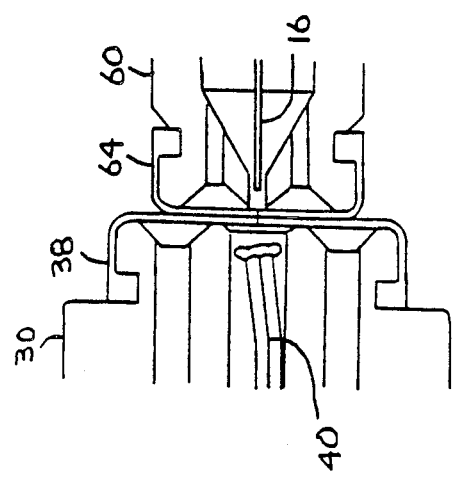
FIG. 4 illustrates the initial engagement position of the mating ends of the male and female connector components.
Figure 3:
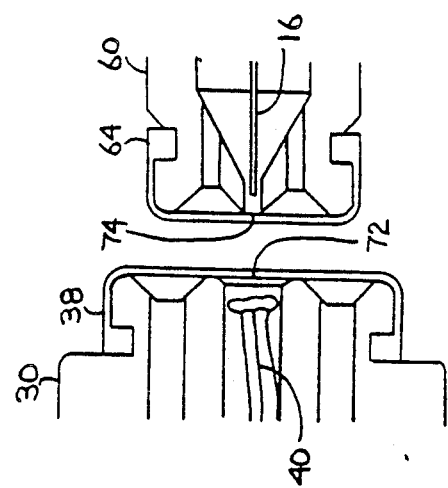
FIG. 3 illustrates the pre-engagement position of the mating ends of the male and female connector components.

Referring to FIGS. 3, 4, and 5, it can be seen that the two mating ends of the guide holder 30 and plunger 60 have alternating regions of concavity and convexity that form regions of peaks and valleys. These regions are inverse to each other such that the concave regions of the mating end of guide holder 30 are connected with the convex regions of the mating end of plunger 60 so that the parts can nest together providing a self-centering action. These regions of concavity and convexity can be formed by making concentric grooves in the parts. In addition, both mating ends are covered with the elastic seals 38 and 64 that have small apertures 72 and 74 at their centers. These apertures remain closed prior to engagement to contain the optically transparent fluid and prevent contamination of the fibers. As seen in FIG. 4, as the parts come into contact, the surrounding air or fluid is squeezed out between the faces of the seals and any contaminants are essentially expelled or trapped between the elastic surfaces. As the plunger 60 and guide holder 30 continue to seat as shown in FIG. 5, both elastic seals are stretched over the annular ring surfaces causing the apertures 72 and 74 to open and allow the optically transparent fluid to freely flow between the halves. The fiber 16 is now free to enter the alignment guide 40 surrounded by a contaminant-free fluid without exposure to the outside environment and not contacting any part of the sealing membranes, thereby preventing breakage or damage to the delicate fiber.

Figure 6:
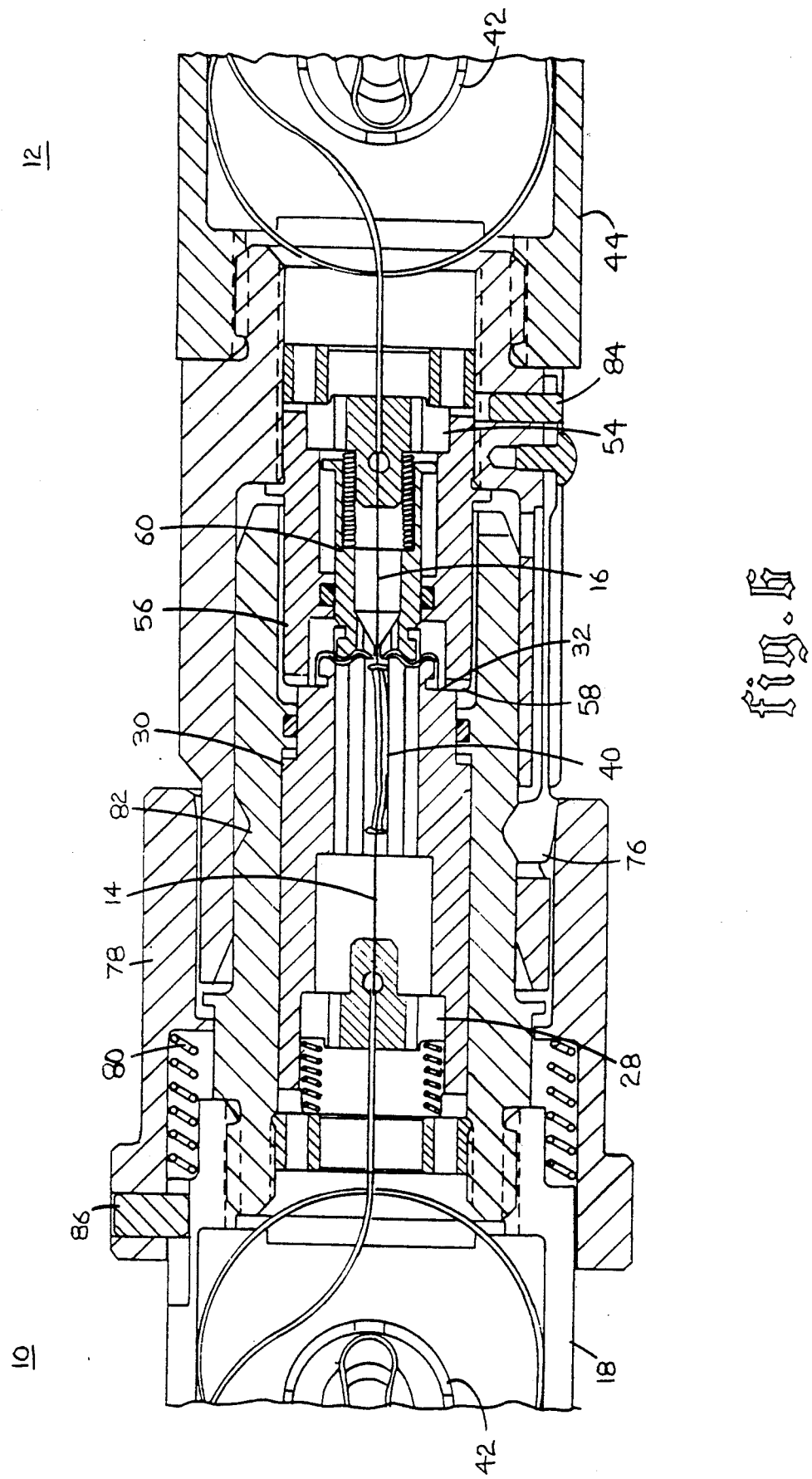
FIG. 6 illustrates an enlarged view of the plug and receptacle connector components in a seated position.

Referring to FIG. 6, after the guide holder 30 and the plunger 60 have seated, become self-aligned and the apertures 72 and 74 opened, continuing engagement causes the plunger 60 to be depressed into the plunger guide 56 causing the fiber 16 to pass thru the apertures in the orifice seals and enter the alignment guide 40. Just after the ends of the optical fibers 14 and 16 touch within the alignment guide 40, the contact surfaces 58 of the plunger guide 56 seat on the annular shoulder 32 of the guide holder 30 producing a predetermined flexing of the optical fibers between ferrules 28 and 54. This flexing of the fibers maintains a preload on their contacting optical faces and ensures that the fiber ends remain in intimate contact within the alignment guide 40 in spite of small variations in the position of ferrules 28 and 54 due to fabrication and assembly tolerances, contamination of the mechanical mating surfaces at 32, or extremes in pressure or temperature. Further engagement of the two halves now cause the spring loaded guide holder 30 to become unseated and both plungers are now self-aligned and essentially floating within the connector bodies. Thus, slight variations in the final mated position of the interchangeable connector halves, or axial or bending loads on the mated connector assembly have no effect on the optical connection. Also, the optical contact is independent of the thickness of the orifice seals or any contaminants that may be trapped between them.

The mechanical latching and unlatching of the two connector assemblies 10 and 12 is a simple push and pull operation. The receptacle has three spring latches such as 76, which are deflected radially outward as the plug body 18 enters into the receptacle body 44. As the mating continues, the front faces of latches 76 contact latching collar 78 compressing spring 80. In the final mated position, latches 76 seat into annular groove 82 in plug body 18 allowing collar 78 to snap over and engage the outside surfaces of latches 76 forcing them into a tightly seated position. Axial loads are transferred through the three spring latches 76 to the receptacle body 44 by pins 84. Since rotational motion of the connector halves with respect to each other after mating may cause optical degradation or damage to the butted fibers, means are provided wherein said motion is prevented by pin 86 which keys the plug body 18 to collar 78 which in turn is locked onto receptacle body 44 by the wedging action in the mating surfaces of latches 76. To release the mated assembly, the latching collar 78 is simply compressed and the two spring-loaded halves separate.

Prior to mating of the connector components 10 and 12, any pressure differential between the fluid enclosed within housings 18 and 44 and the surrounding environment would cause loss or contamination of said fluid through the normally closed apertures 72 and 74 in the thin membrane elastic orifice seals 38 and 64. In addition, during the mating and unmating of connector components 10 and 12, a significant displacement of said fluid must be accommodated due to the reciprocal motion of guide holder 30 and plunger 60 within housings 18 and 44. The pressure equalizing device 42 shown in FIG. 7 depicts a solution that maintains a zero pressure differential between the connector fluid and the surrounding environment despite changes in fluid volume or movement of said guide holder and plunger within said housings. It consists of a thin elastomeric tube 88 installed within a protective housing 90 containing vents 92 and sealed at both ends with flanged collars 94. The assembly is installed within housings 18 and 44 as they are filled with pressure equalizing fluid, sealed with o-rings 98 and captured with retaining rings 100. The tube is so constructed as to allow it to change shape with essentially no elastic deformation or stretching as shown at 96. Air or fluids are free to flow through the center of the tube; and since the thin-wall elastomeric tube can change shape and thus its cross-sectional area without stretching, a zero pressure differential is thus maintained within the limits of a fully expanded tube and a fully collapsed tube. Unlike other compensators with bladders surrounding the pressure equalizing fluid, this design allows use of a thin and flexible membrane in the pressure equalizing device and yet accommodates large "g" forces, or shocks due to handling, since most of the fluid mass is supported by the walls of the connector housing.

Figure 9:
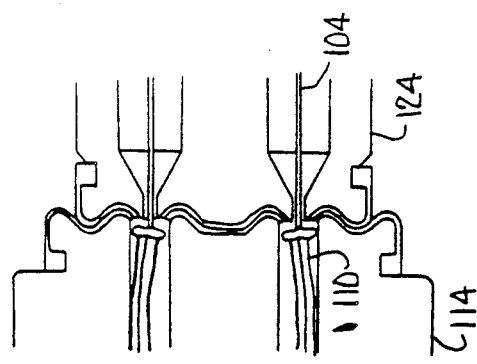
FIG. 9 illustrates an enlarged view of the seated position of the mating ends for the male and female connector components of a multi-fiber connector assembly.
Figure 2:
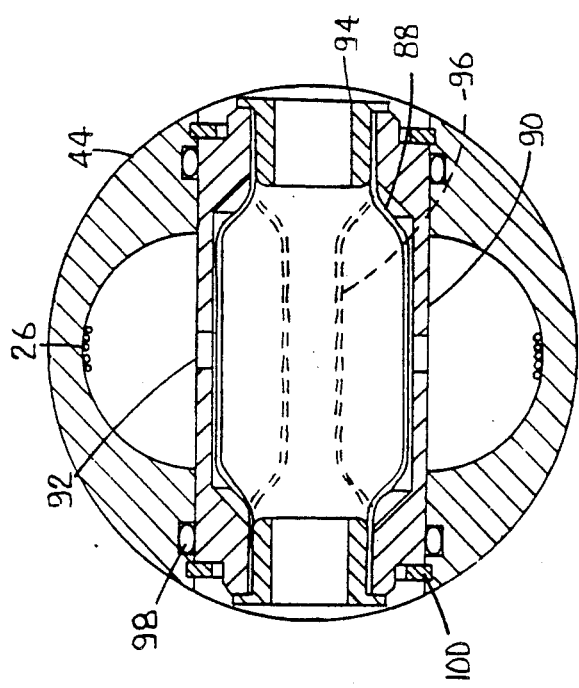
Figure 10:
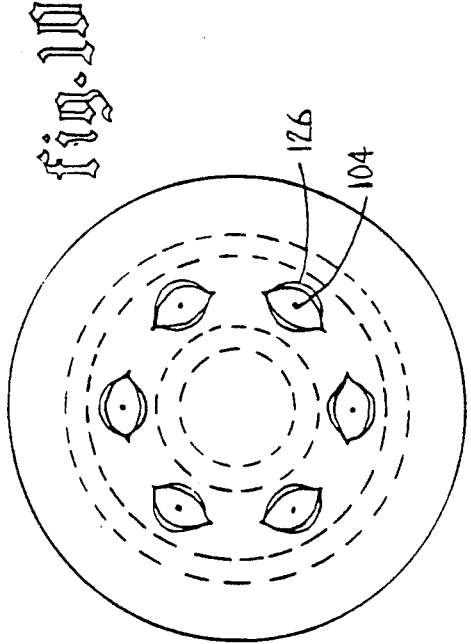
FIG. 10 illustrates an end view of the elastomeric sealing membrane with slits in an open position for a multi-fiber connector assembly.

FIG. 8 illustrates a multi-fiber connector assembly with the same optical performance, interchangeability, and underwater mating capability as the single coaxial connector except that rotational alignment between mating parts must be maintained. Mating pairs of optical fibers 102 and 104 are axially positioned and fixed relative to ferrules 106 and 108. Fibers 102 are inserted into alignment guides 110 and their ends axially positioned relative to shoulder 112 as ferrules 106 seat within guide holder 114. The ends of fibers 104 are positioned relative to contact surfaces 116 as ferrules 108 seat within plunger guide assembly 118. Ferrules are held in place by suitable means such as spring washers 120 and screws 122. Each fiber has a service loop as in the aforementioned single fiber coaxial connector and thus any fiber can be independently serviced or re-terminated without affecting the other fibers or the mechanical termination of the cable itself. The mating of the two connector halves is identical to that previously described and each fiber pair becomes independently preloaded within alignment guides 110 thus greatly easing the fabrication and assembly tolerances in addition to providing for complete interchangeability and extremes in environmental conditions. The spring loaded plungers 114 and 124 for the multi-fiber connector also have mating surfaces of alternating regions of concavity and convexity which are covered by elastomeric orifices seals similar to those previously described except that the apertures are located on the peaks and valleys of the concentric rings instead of in the center, as shown in FIGS. 9 and 10. The apertures, or slits, in the membranes are tangent to these rings and normally closed. Mating of the two convoluted halves stretches each aperture open in a direction perpendicular to said rings, such as 126, allowing the fiber 104 to pass therethrough.

Although the preferred embodiment of the invention as herein set forth relates to the task of achieving rapid and repeatable low-loss coupling of undersea fiber optic cable under a wide range of pressure, temperature, and ocean floor conditions; it will be appreciated and should be understood that the present invention has application in a variety of environments and includes the mating of more than one pair of optical fibers within the male and female connector components. It can be readily seen that there is provided by this invention a novel coaxial fiber optic connector having a water-tight construction for wet matable applications that is pressure compensated and easily serviced.

Although there has been illustrated and described a specific embodiment, it is clearly understood that the same was merely for purposes of illustration and changes and modifications may be readily made therein by those skilled in the art without departing from the spirit and scope of this invention.

What we claim is:

1. A fiber optic connector for connecting optical fibers, comprising:
    a) a plug component housing having at one end a first terminating member for connecting a first optical fiber, the plug component housing containing therein a first plunger assembly for securing and extending the end of the first optical fiber into a fiber guide, a first mating surface at the end of the plunger assembly having a plurality of concentric grooves creating alternating regions of concavity and convexity forming a mating surface with peaks and valleys, an elastomeric sealing means, having a normally closed aperture therein, for covering the first mating surface of the plug component housing; and
    b) a receptacle component housing for connection with the plug component housing having at one end a second terminating member for connecting a second optical fiber, the receptacle component housing containing a second plunger assembly that encloses and secures the end of the second optical fiber and having a second mating surface with a plurality of concentric grooves creating alternating regions of convexity and convavity in a position inverse to the regions of concavity and convexity of the first mating surface for connection therewith, a second elastomeric sealing means, having a normally closed aperture therein, for covering the second mating surface of the second plunger assembly of the receptacle component housing; and
    c. engagement means for connecting the ends of the first and second optical fibers wherein the inverse regions of concavity and convexity of the first and second plunger assemblies mate causing the first and second elastomeric sealing means to seal when the plug and receptacle component housings are brought into contact and the elastomeric sealing means subsequently stretch when the convex regions seat within the concave regions opening the normally closed apertures and extending the second optical fiber therethrough to engage the first optical fiber within the fiber guide.

2. A fiber optic connector as recited in claim 1 wherein the first and second elastomeric sealing means provide contaminant free housings for sealing the first and second optical fibers in the plug and receptacle housings from the surrounding environment during engagement and disengagement of the plug and receptacle component housings.

3. A fiber optic connector as recited in claim 2 wherein the first and second terminating members are removable for replacing and servicing of the plug and receptacle connector component housings.

4. A fiber optic connector as recited in claim 3 wherein the plug component housing is disposed for storing a predetermined length of the first optical fiber therein for replacing and servicing the plug component housing.

5. A fiber optic connector as recited in claim 4 wherein the plug component housing is filled with an index of refraction matching fluid.

6. A fiber optic connector as recited in claim 5 wherein the plug component housing has passing therethrough an elastomeric tube, the ends of which are sealed to the walls of the housing, such that air or fluid from the surrounding environment may pass through the center of the tube wherein pressure differentials in the surrounding environment distorts the shape of the elastomeric tube to maintain a zero pressure differential between the enclosed fluid and the surrounding environment.

7. A fiber optic connector as recited in claim 3 wherein the receptacle component housing is disposed for storing a predetermined length of the second optical fiber therein for replacing and servicing the receptacle component housing.

8. A fiber optic connector as recited in claim 7 wherein the receptacle component housing is filled with an index of refraction matching fluid.

9. A fiber optic connector as recited in claim 8 wherein the receptacle component housing has passing therethrough an elastomeric tube, the ends of which are sealed to the walls of the housing, such that air or fluid from the surrounding environment may pass through the center of the tube whereby pressure differentials in the surrounding environment distorts the shape of the elastomeric tube to maintain a zero pressure differential between the enclosed fluid and the surrounding environment.

10. A fiber optic connector as recited in claim 1 wherein the plug and receptacle component housings have a latching means for latching the plug component housing to the receptacle component housing in any rotational position and locking the component housings to prevent rotational motion of the component housings with respect to each other.

11. A fiber optic connector as recited in claim 10 wherein the latching means is comprised of spring latches on the receptacle component housing that engage an annular groove in the plug component housing and are held into engagement by a spring loaded latching collar due to wedging action between the latching collar, and the spring latches into the annular groove.

12. A fiber optic connector for connecting a multitude of pairs of optical fibers, comprising:
    a) a plug component housing having at one end a first terminating member for connecting a first set of optical fibers, the plug component housing containing therein a first plunger assembly for securing and extending the ends of the first set of optical fibers into fiber guides, a first mating surface at the end of the plunger assembly having a plurality of concentric grooves creating alternating regions of concavity and convexity forming a mating surface with peaks and valleys, an elastomeric sealing means, having normally closed apertures therein, for covering the first mating surface; and b) a receptacle component housing for connection with the plug component housing having at one end a second terminating member for connecting a second set of optical fibers, the receptacle component housing containing a second plunger assembly that encloses and secures the ends of the second set of optical fibers and having a second mating surface with a plurality of concentric grooves creating alternating regions of convexity and concavity in a position inverse to the regions of concavity and convexity of the first mating surface for connection therewith, a second elastomeric sealing means, having normally closed apertures therein, for covering the second mating surface of the second plunger assembly of the receptacle component housing; and c) engagement means for connecting the ends of the first and second sets of optical fibers whereby the inverse regions of concavity and convexity of the first and second plunger assemblies mate causing the first and second elastomeric sealing means to seal when the plug and receptacle component housings are brought into contact and the elastomeric sealing means subsequently stretch when the convex regions seat within the concave regions opening the normally closed apertures and extending the second set of optical fibers therethrough to engage the first set of optical fibers within the fiber guides.

13. A fiber optic connector as recited in claim 12 wherein the first and second elastomeric sealing means provide contaminant free housings for sealing the first and second sets of optical fibers in the plug and receptacle housings from the surrounding environment during engagement and disengagement of the plug and receptacle component housings.

14. A fiber optic connector as recited in claim 13 wherein the first and second terminating members are removable for replacing and servicing of the plug and receptacle connector component housings.

15. A fiber optic connector as recited in claim 14 wherein the plug component housing is disposed for storing a predetermined length of the first set of optical fibers therein for replacing and servicing the plug component housing.

16. A fiber optic connector as recited in claim 14 wherein the receptacle component housing is disposed for storing a predetermined length of the second set of optical fibers therein for replacing and servicing the receptacle component housing.

17. A fiber optic connector as recited in claim 13 wherein the plug component housing is filled with an index of refraction matching fluid.

18. A fiber optic connector as recited in claim 17 wherein the plug component housing has passing therethrough an elastomeric tube, the ends of which are sealed to the walls of the housing, such that air or fluid from the surrounding environment may pass through the center of the tube whereby pressure differentials in the surrounding environment distorts the shape of the elastomeric tube to maintain a zero pressure differential between the enclosed fluid and the surrounding environment.

19. A fiber optic connector as recited in claim 13 wherein the receptacle component housing is filled with an index of refraction matching fluid.

20. A fiber optic connector as recited in claim 19 wherein the receptacle component housing has passing therethrough an elastomeric tube, the ends of which are sealed to the walls of the housing, such that air or fluid from the surrounding environment may pass through the center of the tube whereby pressure differentials in the surrounding environment distorts the shape of the elastomeric tube to maintain a zero pressure differential between the enclosed fluid and the surrounding environment.

21. A fiber optic connector as recited in claim 12 wherein the plug and receptacle component housings have a latching means for latching the plug component housing to the receptacle component housing in any rotational position and locking the component housings to prevent rotational motion of the component housings with respect to each other.

22. A fiber optic connector as recited in claim 21 wherein the latching means is comprised of spring latches on the receptacle component housing that engage an annular groove in the plug component housing and are held into engagement by a spring loaded latching collar due to wedging action between the latching collar, and the spring latches into the annular groove.

* * * * *